(12) United States Patent
Jia

(10) Patent No.: US 11,893,823 B2
(45) Date of Patent: Feb. 6, 2024

(54) ELECTRONIC DEVICE AND METHOD FOR CONTROLLING SAME

(71) Applicant: GUANGDONG OPPO MOBILE TELECOMMUNICATIONS CORP., LTD., Dongguan (CN)

(72) Inventor: Yuhu Jia, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 38 days.

(21) Appl. No.: 17/668,780

(22) Filed: Feb. 10, 2022

(65) Prior Publication Data

US 2022/0165084 A1    May 26, 2022

Related U.S. Application Data

(63) Continuation of application No. PCT/CN2020/121533, filed on Oct. 16, 2020.

(30) Foreign Application Priority Data

Nov. 7, 2019   (CN) .......................... 201911084088.9

(51) Int. Cl.
   *G06V 40/13*       (2022.01)
   *G06V 40/12*       (2022.01)
   (Continued)

(52) U.S. Cl.
   CPC ......... *G06V 40/1318* (2022.01); *G02B 7/023* (2013.01); *G02B 7/1821* (2013.01);
   (Continued)

(58) Field of Classification Search
   CPC ............. G06V 40/1318; G06V 10/147; G06V 10/993; G06V 40/1365; G06V 40/1324;
   (Continued)

(56) References Cited

U.S. PATENT DOCUMENTS 6,005,704 A * 12/1999 Chmielewski, Jr ...... G07C 9/37
                                                       348/E13.016
2021/0224502 A1* 7/2021 Liu ..................... G06V 40/1318

FOREIGN PATENT DOCUMENTS

CN      101290465 A    10/2008
CN      108307009 A     7/2018
(Continued)

OTHER PUBLICATIONS

The Second Office Action dated Aug. 3, 2022 from Chinese Patent Application No. 201911084088.9.
(Continued)

*Primary Examiner* — Abhishek Sarma
(74) *Attorney, Agent, or Firm* — BAYES PLLC

(57) ABSTRACT

An electronic device includes a display screen, a first lens module, a fingerprint sensor, and a first driving mechanism. The first lens module, the fingerprint sensor, and the first driving mechanism are disposed close to a non-display surface of the display screen. The fingerprint sensor is configured to receive an optical signal transmitted through the display screen and the first lens module to collect fingerprint information. The first driving mechanism is configured to drive the first lens module to move, so as to change a fingerprint information collection area of the fingerprint sensor.

19 Claims, 3 Drawing Sheets

(51) Int. Cl.
*G06V 10/147* (2022.01)
*G06V 10/98* (2022.01)
*G02B 7/02* (2021.01)
*G02B 7/182* (2021.01)

(52) U.S. Cl.
CPC .......... *G06V 10/147* (2022.01); *G06V 10/993* (2022.01); *G06V 40/1365* (2022.01)

(58) Field of Classification Search
CPC ........ G02B 7/023; G02B 7/1821; G02B 7/08; G02B 26/0816
See application file for complete search history.

(56) References Cited

FOREIGN PATENT DOCUMENTS

| | | |
|---|---|---|
| CN | 109241957 A | 1/2019 |
| CN | 109416740 A | 3/2019 |
| CN | 109447027 A | 3/2019 |
| CN | 109496314 A | 3/2019 |
| CN | 109543660 A | 3/2019 |
| CN | 109643382 A | 4/2019 |
| CN | 109685034 A | 4/2019 |
| CN | 110852251 A | 2/2020 |
| WO | 9743677 A1 | 11/1997 |
| WO | 2020077505 A1 | 4/2020 |

OTHER PUBLICATIONS

International Search Report and the Written Opinion dated Jan. 26, 2021 From the International Searching Authority Re. Application No. PCT/CN2020/121533, 13 pages.

The first Office Action dated Jan. 6, 2022 from from China Application No. 201911084088.9, 22 pages.

The Notice of Allowance dated Dec. 28, 2022 from Chinese patent application No. 201911084088.9.

Li Zhi-peng et al. "Optical fingerprint collection and processing", Physics Experimentation, vol. 37, Issue No. S1; Dec. 31, 2017 (Dec. 31, 2017), the whole document.

Yufei Zhang "The study on fingerprint imaging of mobile phone based on the self-focusing lens array", China Master's Theses Full-text Database Information Technology Series, Issue No. 01; Jan. 15, 2019 (Jan. 15, 2019), the whole document.

The supplementary European search report dated Oct. 10, 2022 from European patent Application No. 20884301.1.

* cited by examiner

ELECTRONIC DEVICE AND METHOD FOR CONTROLLING SAME

CROSS REFERENCE TO RELATED APPLICATIONS

This application is a continuation of International Application No. PCT/CN2020/121533 filed on Oct. 16, 2020, which claims priority to Chinese Application No. 201911084088.9, titled "Electronic Device and Method for Controlling Same", filed on Nov. 7, 2019, the entire contents of which are incorporated herein by reference un their entireties.

FIELD OF INVENTION

The present disclosure relates to the technical field of fingerprint collection, and particularly to an electronic device and a method for controlling the same.

BACKGROUND

With the rapid development of communication technology, electronic devices such as smartphones are becoming more popular. Electronic devices generally have a fingerprint recognition function to unlock smartphones or make mobile payments.

In the related art, a fingerprint sensor is generally fixed at a preset position of a smartphone. When a user uses a fingerprint recognition function, the user needs to press a finger on the preset position to perform fingerprint recognition, which is inconvenient to operate.

SUMMARY

The present disclosure provides an electronic device and a method for controlling the same, which can change a collection area of fingerprint information, thereby improving a degree of freedom of fingerprint recognition.

The present disclosure provides an electronic device comprising a display screen, a first lens module, a fingerprint sensor, and a first driving mechanism. The display screen comprises a display surface and a non-display surface opposite to each other. The first lens module, the fingerprint sensor, and the first driving mechanism are disposed close to the non-display surface. The first lens module is connected to the first driving mechanism. The fingerprint sensor is configured to receive an optical signal transmitted through the non-display surface and the first lens module to collect fingerprint information. The first driving mechanism is configured to drive the first lens module to move, so as to change a fingerprint information collection area of the fingerprint sensor.

The present disclosure further provides a method for controlling an electronic device. The electronic device comprises a display screen, a first lens module, a fingerprint sensor, and a first driving mechanism. The display screen comprises a display surface and a non-display surface opposite to each other. The first lens module, the fingerprint sensor, and the first driving mechanism are disposed close to the non-display surface. The first lens module is connected to the first driving mechanism. The method for controlling the electronic device comprises:

obtaining a detection result of the display screen;
when the detection result comprises a pressing operation, controlling the fingerprint sensor to collect fingerprint information according to the pressing operation;
determining whether the fingerprint sensor has collected the fingerprint information; and
if the fingerprint sensor does not collect the fingerprint information, controlling the first lens module to move, so as to increase a fingerprint information collection area of the fingerprint sensor.

DETAILED DESCRIPTION OF EMBODIMENTS

Figure 1:
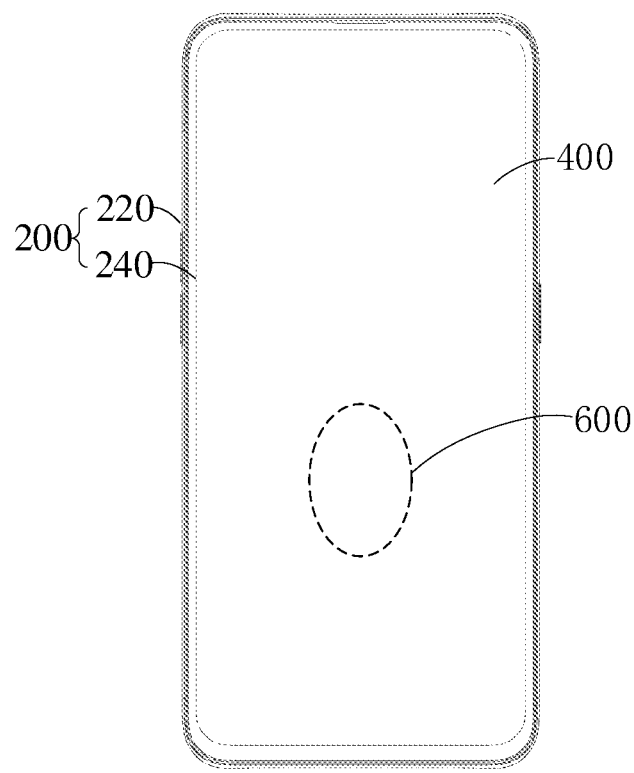
FIG. 1 is a schematic diagram of a first structure of an electronic device according to an embodiment of the present disclosure.

The present disclosure provides an electronic device. The electronic device comprises a display screen, a first lens module, a fingerprint sensor, and a first driving mechanism. The display screen comprises a display surface and a non-display surface opposite to each other. The first lens module, the fingerprint sensor, and the first driving mechanism are disposed close to the non-display surface. The first lens module is connected to the first driving mechanism. The fingerprint sensor is configured to receive an optical signal transmitted through the non-display surface and the first lens module to collect fingerprint information. The first driving mechanism is configured to drive the first lens module to move, so as to change a fingerprint information collection area of the fingerprint sensor.

In an embodiment, the first lens module is disposed between the non-display surface and the fingerprint sensor, and the first driving mechanism is configured to drive the first lens module to move in a direction perpendicular to the non-display surface.

In an embodiment, the electronic device further comprises a reflector. The reflector is disposed close to the non-display surface, is disposed corresponding to the first lens module, and is configured to reflect the optical signal transmitted through the display screen to the first lens module.

In an embodiment, the electronic device further comprises a reflector. The reflector is disposed close to the non-display surface, is disposed obliquely with respect to the non-display surface, and is configured to reflect the optical signal transmitted through the display screen to the first lens module. The first driving mechanism is further configured to drive the first lens module to move in a direction parallel to the non-display surface.

In an embodiment, the electronic device further comprises a second driving mechanism. The second driving mechanism is connected to the reflector and is configured to drive the reflector to rotate, so as to increase a signal amount of the optical signal reflected to the first lens module.

In an embodiment, the electronic device further comprises a second lens module. The second lens module is disposed between the display screen and the reflector and is configured to condense the optical signal transmitted through the display screen to the reflector, so as to increase a signal amount of the optical signal received by the reflector.

In an embodiment, the electronic device further comprises a third lens module. The third lens module is disposed between the reflector and the first lens module and is configured to condense the optical signal reflected by the reflector to the first lens module, so as to increase a signal amount of the optical signal received by the first lens module. A size of the third lens module is greater than a size of the first lens module.

In an embodiment, the electronic device further comprises a third driving mechanism and a processor. The third driving mechanism is connected to the fingerprint sensor and is configured to drive the fingerprint sensor to move. The processor is connected to the third driving mechanism and is configured to control the fingerprint sensor to move in a direction perpendicular to an optical path of the optical signal received by the fingerprint sensor when the fingerprint information collected by the fingerprint sensor does not reach a preset condition, so as to fine adjust a position of the fingerprint sensor, so that a focus of the first lens module is located on the fingerprint sensor.

In an embodiment, the processor is further connected to the first driving mechanism, and is further configured to receive an adjustment instruction, and control a movement of the first lens module according to the adjustment instruction, so as to increase or decrease the fingerprint information collection area of the fingerprint sensor.

In an embodiment, the processor is further connected to the first driving mechanism, and is further configured to control a movement of the first lens module to increase the fingerprint information collection area of the fingerprint sensor when the fingerprint sensor does not collect the fingerprint information or a matching degree between the fingerprint information collected by the fingerprint sensor and a preset fingerprint information is lower than a preset value.

In an embodiment, the processor is further configured for: when receiving a fingerprint collection instruction, determining whether the fingerprint sensor has collected the fingerprint information; if the fingerprint sensor does not collect the fingerprint information, controlling the first lens module to move, so as to increase the fingerprint information collection area of the fingerprint sensor; if the fingerprint sensor collects the fingerprint information, determining whether the matching degree between the collected fingerprint information and the preset fingerprint information is lower than the preset value; and if the matching degree between the collected fingerprint information and the preset fingerprint information is lower than the preset value, controlling the first lens module to move, so as to increase the fingerprint information collection area of the fingerprint sensor.

In an embodiment, the electronic device further comprises a casing. The casing is connected with the display screen to form a storage space. The first lens module, the fingerprint sensor, and the first driving mechanism are disposed on the casing and located in the storage space.

In an embodiment, the first driving mechanism comprises a drive motor and a transmission assembly. An output end of the drive motor is connected to the transmission assembly.

The transmission assembly is connected to the first lens module. The drive motor is configured to drive the transmission assembly to drive the first lens module to move.

In an embodiment, the transmission assembly comprises one or two of a screw rod, a slide rail, and a gear module.

In an embodiment, the transmission assembly comprises a screw rod and a slide rail. The first lens module is disposed on the sliding rail. The drive motor drives the first lens module to move on the slide rail through the screw rod.

In an embodiment, the first driving mechanism comprises a drive motor, a fixing bracket, a screw rod, and a slide rail. The fixing bracket is provided with a through hole. The screw rod is penetrated in the through hole and is rotatably connected to a hole wall of the through hole. An end of the screw rod is connected to the drive motor. An end of the first lens module is slidably connected to the slide rail, and other end of the first lens module is connected to the fixing bracket. The drive motor is configured to drive the screw rod to rotate to drive the fixing bracket to move. When the fixing bracket moves, the fixing bracket drives the first lens module to move on the slide rail.

The present disclosure further provides a method for controlling an electronic device. The electronic device comprises a display screen, a first lens module, a fingerprint sensor, and a first driving mechanism. The display screen comprises a display surface and a non-display surface opposite to each other. The first lens module, the fingerprint sensor, and the first driving mechanism are disposed close to the non-display surface. The first lens module is connected to the first driving mechanism. The method for controlling the electronic device comprises:

obtaining a detection result of the display screen;
when the detection result comprises a pressing operation, controlling the fingerprint sensor to collect fingerprint information according to the pressing operation;
determining whether the fingerprint sensor has collected the fingerprint information; and
if the fingerprint sensor does not collect the fingerprint information, controlling the first lens module to move, so as to increase a fingerprint information collection area of the fingerprint sensor.

In an embodiment, the step of "if the fingerprint sensor does not collect the fingerprint information, controlling the first lens module to move, so as to increase the fingerprint information collection area of the fingerprint sensor" comprises: if the fingerprint sensor collects the fingerprint information, determining whether a matching degree between the fingerprint information collected by the fingerprint sensor and a preset fingerprint information reaches a preset value; and if the matching degree between the fingerprint information collected by the fingerprint sensor and the preset fingerprint information does not reach the preset value, controlling the first lens module to continue to move.

In an embodiment, the step of "if the fingerprint sensor collects the fingerprint information, determining whether the matching degree between the fingerprint information collected by the fingerprint sensor and the preset fingerprint information reaches a preset value" comprises: collecting fingerprint information in real time through the fingerprint sensor during a movement of the first lens module, and comparing newly collected fingerprint information with the preset fingerprint information to obtain the matching degree.

In an embodiment, the step of "if the matching degree between the fingerprint information collected by the fingerprint sensor and the preset fingerprint information does not reach the preset value, controlling the first lens module to continue to move" comprises: if the matching degree between the fingerprint information collected by the fingerprint sensor and the preset fingerprint information reaches the preset value, controlling the first lens module to stop moving.

Figure 2:
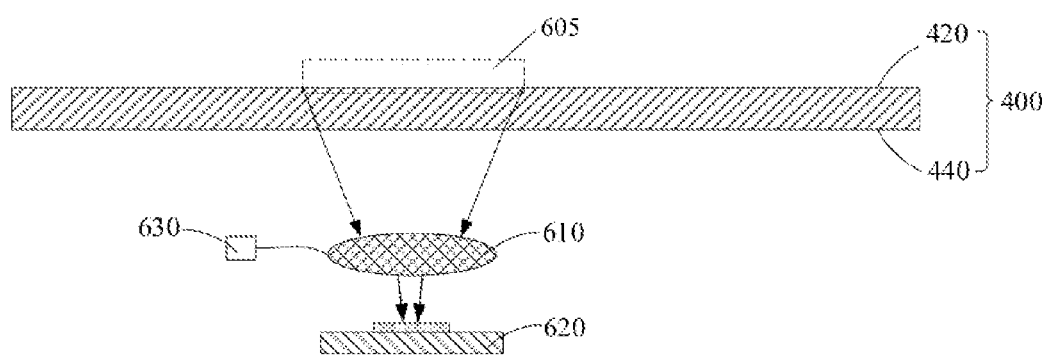
FIG. 2 is a schematic diagram of a first structure of a display screen and a fingerprint collection device in the electronic device shown in FIG. 1.

Please refer to FIG. 1 and FIG. 2. FIG. 1 is a schematic diagram of a first structure of an electronic device according to an embodiment of the present disclosure. FIG. 2 is a schematic diagram of a first structure of a display screen and a fingerprint collection device in the electronic device shown in FIG. 1. An electronic device 20 of FIG. 1 may comprise a casing 200, a display screen 400, and a fingerprint collection device 600. The display screen 400 and the fingerprint collection device 600 may be disposed on the casing 200.

The electronic device 20 may be a computing device such as a handheld or portable electronic device (such as a laptop computer, a computer monitor containing an embedded computer, a tablet computer, a cell phone, or a media player), a small device (such as a wristwatch device, a hanging device, an earphone or earpiece device, a device embedded in a glasses, a device worn on a user's head, or other wearable or miniature device), a television, a computer monitor that does not contain an embedded computer, a game device, a navigation device, an embedded system (such as a system in which an electronic device with a display device is installed in a kiosk or a car), a device that implements functions of two or more of the above devices, or other electronic device. In an exemplary configuration of FIG. 1, the electronic device 20 is a portable device, such as a cell phone, a media player, a tablet computer, or other portable computing device. Other configurations are available to the electronic device 20, if desired. FIG. 1 is only exemplary.

The casing 200 may be made of plastic, glass, ceramic, a fiber composite, a metal (e.g. stainless steel and aluminum), other suitable material, or a combination of any two or more of these materials. The casing 200 may be integrally formed. In an integrally formed process, some or all of the casing 200 is machined or molded as a single structure, or may be formed from multiple structures (e.g. an inner frame structure, and one or more structures forming an outer casing surface). The casing 200 may be provided with a receiving cavity to receive components of the electronic device 10 such as a battery and the fingerprint collection device 600.

The casing 200 may comprise a middle frame 220 and a cover plate 240. The middle frame 220 may serve as a carrier of the electronic device 20.

For example, the middle frame 220 may carry components such as the display screen 400 and the fingerprint collection device 600 of the electronic device 20. The middle frame 220 may be made of a metal material, may be formed by injection molding, or may be formed by mechanical processing.

The cover plate 240 is disposed on the middle frame 220 and covers the display screen 400 to protect the display screen 400 from being scratched or damaged by water. The cover plate 240 may be a transparent glass cover plate, so that a user can observe a content displayed on the display screen 101 through the cover plate 240. It can be understood that the cover plate 240 may be a cover plate made of a sapphire material.

The display screen 400 may be disposed in the casing 200 and connected to the casing 200 to form a storage space. The display screen 400 may comprise a display pixel array composed of liquid crystal display (LCD) components, an electrophoretic display pixel array, a plasma display pixel array, an organic light emitting diode display pixel array, an electrowetting display pixel array, or a display pixel array based on other display technologies. The display screen 400 comprises a display surface 420 and a non-display surface 440 opposite to each other. The display surface 420 refers to a surface of the display screen 400 that can display images. The non-display surface 440 refers to a surface of the display screen 400 that cannot display images.

The fingerprint collection device 600 can be disposed on the casing 200, such as on the middle frame 220. And, the fingerprint collection device 600 is located in the storage space formed by the casing 200 and the display screen 400. The fingerprint collection device 600 may be configured to collect fingerprint information located on the display screen 400, so as to realize a fingerprint recognition function of the electronic device 20.

The fingerprint collection device 600 may comprise a first lens module 610, a fingerprint sensor 620, and a first driving mechanism 630. The first lens module 620, the fingerprint sensor 620, and the first driving mechanism 630 are all disposed close to the non-display surface 440 of the display screen 400. It can be understood that the fingerprint collection device 600 is located below the display screen 400 to collect the fingerprint information located on the display surface 420 of the display screen 400. The fingerprint information located on the display surface 420 may be fingerprint information of the user's finger pressing on the display surface 420, or fingerprint information of the user's finger located above the display surface 420.

The first lens module 610 may comprise one or more lenses. The one or more lenses may be configured to receive an optical signal transmitted through the non-display surface 440 of the display screen 400 and transmit the optical signal to the fingerprint sensor 620. The first lens module 610 is movably disposed on the casing 200, for example, disposed on the middle frame 220. The first lens module 610 can move relative to the non-display surface 440 of the display screen 400, thereby changing a distance between the first lens module 610 and the fingerprint sensor 620.

For example, the first lens module 610 may be disposed between the non-display surface 440 and the fingerprint sensor 620. The first lens module 610 can move in a direction perpendicular to the non-display surface 440.

It should be noted that in some embodiments, the first lens module 610 may be disposed at other positions on the casing 200. The first lens module 610 may move in a direction parallel to the non-display surface 440, or the first lens module 610 may move in a direction inclined to the non-display surface 440.

The first driving mechanism 630 may be disposed on the middle frame 220, and the first driving mechanism 630 is connected to the first lens module 610. The first driving mechanism 630 is configured to drive the first lens module 610 to move relative to the non-display surface 440 of the display screen 400. The first driving mechanism 630 may comprise a drive motor and a transmission assembly. An output end of the drive motor is connected to the transmission assembly. The transmission assembly is connected to the first lens module 610. The drive motor can drive the transmission assembly to drive the first lens module 610 to move. The transmission assembly comprises one or two of a screw rod, a slide rail, and a gear module.

For example, the first driving mechanism 630 may comprise a drive motor and a screw rod. The output end of the drive motor is connected to the screw rod, and the first lens module 610 is connected to the screw rod. The drive motor can drive the screw rod to rotate. When the screw rod is rotated, the screw rod can drive the first lens module 610 to move, and change the distance between the first lens module 610 and the fingerprint sensor 620. Alternatively, in order to increase a movement stability of the first lens module 610, the first driving mechanism 630 may further comprise a slide rail, and the first lens module 610 is disposed on the slide rail. The drive motor can drive the first lens module 610 to move smoothly on the slide rail through the screw rod.

In some embodiments, the first driving mechanism 630 may comprise a drive motor and a gear module. The drive motor is connected to the gear module. The gear module is connected to the first lens module 610. The drive motor drives the gear module to rotate, so that the gear module drives the first lens module 610 to move.

Figure 3:
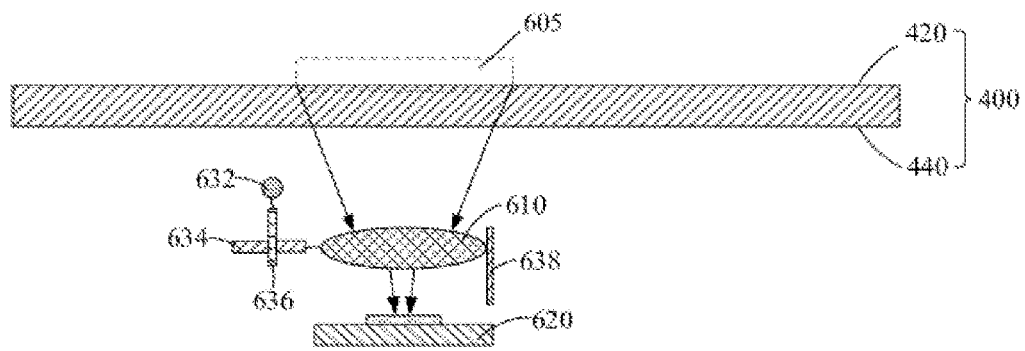
FIG. 3 is a schematic diagram of a second structure of the display screen and the fingerprint collection device in the electronic device shown in FIG. 1.

Please refer to FIG. 3. FIG. 3 is a schematic diagram of a second structure of the display screen and the fingerprint collection device in the electronic device shown in FIG. 1. The first driving mechanism 630 may comprise a drive motor 632 a fixing bracket 634, a screw rod 636, and slide rail 638. The fixing bracket 634 is provided with a through hole. The screw rod 636 is penetrated in the through hole and is rotatably connected to a hole wall of the through hole. An end of the screw rod 636 is connected to the drive motor 632, and other end of the screw rod 636 is connected to the fixing bracket 634. The drive motor 632 is configured to drive the screw rod 636 to rotate, thereby driving the fixing bracket 638 to move. An end of the first lens module 610 is disposed on the slide rail 638 and is slidably connected to the slide rail 638, and other end of the first lens module 610 is connected to the fixing bracket 634, so that the fixing bracket 634 drives the first lens module 610 to move.

The fingerprint sensor 620 is disposed close to the non-display surface 440 and corresponding to the first lens module 610, so that the optical signal transmitted through the non-display surface 440 of the display screen 400 and the first lens module 610 can be transmitted to the fingerprint sensor 620. The fingerprint sensor 620 can complete a collection of the fingerprint information based on the received optical signal. The fingerprint sensor 620 may be an optical fingerprint sensor. The optical fingerprint sensor uses a principle of refraction and/or reflection of an optical signal to collect fingerprint information. Because a fingerprint on a surface of a finger is uneven, an optical signal refracted or reflected by the finger has different light and dark levels, thereby forming image information with different light and dark levels. The fingerprint sensor 620 can complete the collection of the fingerprint information based on the image information. The fingerprint sensor 620 may comprise a substrate and a photosensitive chip. The photosensitive chip is disposed on the substrate. The photosensitive chip can image based on an optical signal it receives.

Based on an imaging principle, it can be understood that when an object distance is fixed, the smaller the distance between the fingerprint sensor 620 and the first lens module 610, the wider the range of optical signals transmitted to the fingerprint sensor 620 through the display screen 400, the more image information the fingerprint sensor 620 collects. Therefore, the fingerprint sensor 620 has a larger fingerprint information collection area 605 and collects more fingerprint information. When the first driving mechanism 630 drives the first lens module 610 to move, the distance between the first lens module 610 and the fingerprint sensor 620 is changed, thereby changing the fingerprint information collection area 605 of the fingerprint sensor 620.

Figure 4:
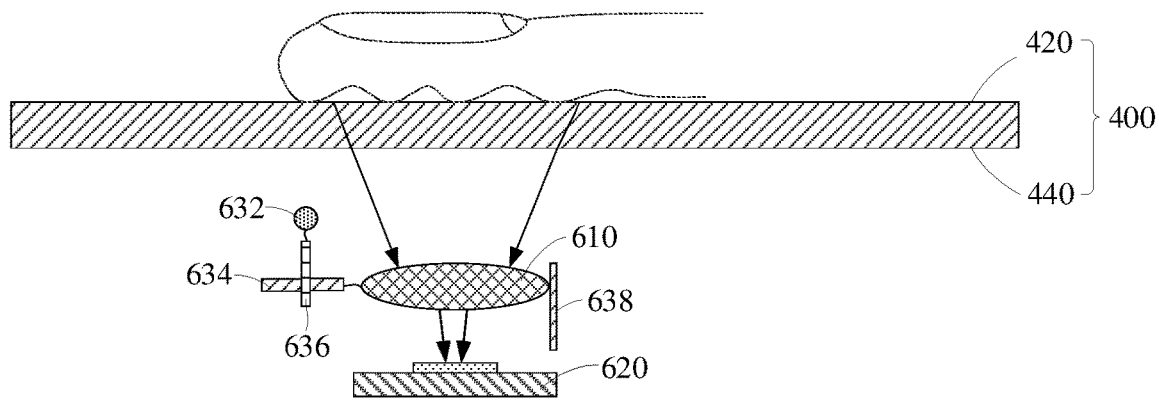
FIG. 4 is an application scenario diagram of the display screen and the fingerprint collection device shown in FIG. 3.

Please refer to FIG. 4. FIG. 4 is an application scenario diagram of the display screen and the fingerprint collection device shown in FIG. 3. When the user's finger presses on the non-display surface 440, an optical signal emitted by the electronic device 20 is transmitted to the user's finger. The user's finger reflects the optical signal to the display screen 400. The reflected optical signal passes through the display screen 400 and is transmitted to the first lens module 610. The first lens module 610 transmits the optical signal transmitted through the display screen 400 to the fingerprint sensor 620. The fingerprint sensor 620 receives the optical signal transmitted through the first lens module 610 and completes the collection of the fingerprint information based on the optical signal. The electronic device 20 may determine whether to control a movement of the first lens module 610 according to the fingerprint information collected by the fingerprint sensor 620.

For example, when the fingerprint sensor 620 cannot collect the fingerprint information of the user, the electronic device 20 can control the movement of the first lens module 610 to increase the fingerprint information collection area 605 of the fingerprint sensor 620. This avoids a situation that the fingerprint sensor 620 cannot collect the user's fingerprint information because the user's finger does not press on a preset area. Alternatively, when the fingerprint information collected by the fingerprint sensor 620 does not match a preset fingerprint information pre-stored in the electronic device 20, the electronic device 20 can control the movement of the first lens module 610 to increase the fingerprint information collection area 605 of the fingerprint sensor 620. This avoids a situation that the fingerprint information collected by the fingerprint sensor 620 does not match the preset fingerprint information pre-stored in the electronic device 20 due to incomplete fingerprint information collection caused by the fingerprint information collection area 605 being too small. It should be noted that situations in which the electronic device 20 controls whether the first lens module 610 moves are not limited to the above situations.

For example, the electronic device 20 may adjust a position of the first lens module 610 in response to a touch command issued by the user.

It should be noted that the optical signal emitted from the electronic device 20 may be directly emitted by the display screen 400.

For example, the display screen 400 is an organic light emitting diode display pixel array. When the electronic device 20 detects a pressing operation on the display screen 400, the electronic device 20 can control the display screen 400 to emit an optical signal. A light source, such as a visible light source, an ultrasonic light source, or an infrared light source, may be disposed close to the non-display surface 440 of the display screen 400. When it is detected that there is a pressing operation on the display screen 400 or a fingerprint collection instruction is received, the light source can emit an optical signal that passes through the display screen 400.

In this embodiment, a movable first lens module is provided, and a distance between the first lens module and a fingerprint sensor is changed to change a fingerprint information collection area of the fingerprint sensor. Compared with a fixed fingerprint information collection area in the related art, this can increase a degree of freedom of fingerprint information collection.

Figure 5:
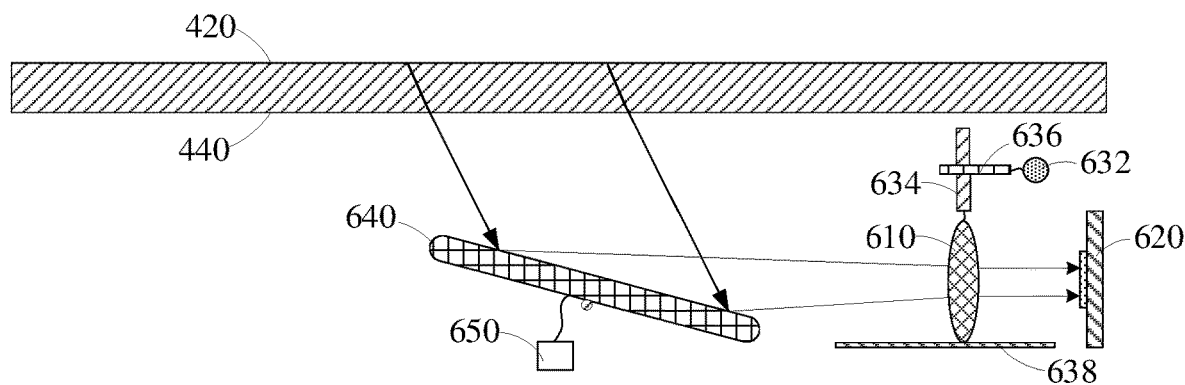
FIG. 5 is a schematic diagram of a third structure of the display screen and the fingerprint collection device in the electronic device shown in FIG. 1.

Please refer to FIG. 5. FIG. 5 is a schematic diagram of a third structure of the display screen and the fingerprint collection device in the electronic device shown in FIG. 1. The fingerprint collection device 600 may further comprise a reflector 640. The reflector 640 is disposed close to the non-display surface 440 of the display screen 400. The reflector 640 is configured to reflect the optical signal transmitted through the display screen 400 to form a reflected optical signal. The reflector 640 is disposed corresponding to the first lens module 610, so that the reflector 640 can reflect the reflected optical signal into the first lens module 610, and the reflected optical signal is transmitted to the fingerprint sensor 620 through the first lens module 610.

Please refer to FIG. 5, the reflector 640 may be inclined relative to the non-display surface 440 of the display screen 400. For example, an angle between the reflector 640 and the non-display surface 440 can be an acute angle (such as 30 degrees, 45 degrees, 50 degrees, or 60 degrees). The first lens module 610 is disposed on a reflection path of the reflector 640, so that the reflected optical signal formed by the reflector 640 can be transmitted to the first lens module 610. The first driving mechanism 630 can drive the first lens module 610 to move in the direction parallel to the non-display surface 440 of the display screen 400.

For example, an optical signal receiving surface of the fingerprint sensor 620 may be set to be perpendicular to the non-display surface 440. The first lens module 610 is disposed corresponding to the fingerprint sensor 620. The first lens module 610 is disposed on an optical path of the optical signal received by the fingerprint sensor 620 and an optical path of the reflected optical signal formed by the reflector 640, so that the optical signal transmitted through the display screen 400 is transmitted to the reflector 640. The reflector 640 reflects the optical signal it receives to form the reflected optical signal, and transmits the reflected optical signal to the first lens module 610. The first lens module 610 transmits the reflected optical signal it receives to form a first transmitted optical signal, and transmits the first transmitted optical signal to the fingerprint sensor 620. The fingerprint sensor 620 collects the fingerprint information based on the first transmitted optical signal.

In this embodiment, the first lens module 610 can move in a direction parallel to the display screen 400. Compared with the first lens module 610 moving in a direction perpendicular to the display screen 400, a movable range of the first lens module 610 is increased. It can be understood that when the first lens module 610 moves in the direction perpendicular to the display screen 400, the first lens module 610 moves in a thickness direction of the electronic device 20. When the first lens module 610 moves in the direction parallel to the non-display surface 440 of the display screen 400, the first lens module 610 moves in a length direction of the electronic device 20. A thickness dimension of the electronic device 20 is generally less than a length dimension of the electronic device 20. Therefore, compared to setting the first lens module 610 to move in the direction perpendicular to the non-display surface 440 of the display screen 400, setting the first lens module 610 to move in the direction parallel to the non-display surface 440 of the display screen 400 increases the movable range of the first lens module 610, thereby increasing a variable range of the fingerprint information collection area 605.

It should be noted that the reflector 640 may be disposed in parallel with the non-display surface 440 of the display screen 400. The first lens module 610 and the fingerprint sensor 620 are disposed between the display screen 400 and the reflector 640. The reflector 640 reflects the optical signal transmitted through the display screen 400 to the first lens module 610, and the optical signal is transmitted to the fingerprint sensor 620 through the first lens module 610.

As shown in FIG. 5, the fingerprint collection device 600 may further comprise a second driving mechanism 650. The second driving mechanism 650 is disposed on the casing 200. The reflector 640 may be disposed on the casing 200 and is rotatably connected to the casing 200 through a rotating member. The second driving mechanism 650 is connected to the reflector 640. The second driving mechanism 650 is configured to drive the reflector 640 to rotate around the rotating member, so as to adjust an inclination angle of the reflector 640, thereby increasing a signal amount of the optical signal reflected by the reflector 640 to the first lens module 610. It can be understood that in this embodiment, the inclination angle of the reflector 640 can be adjusted to adjust a projection point at which the optical signal transmitted through the display screen 400 is incident on the reflector 640, so that the optical signal received by the reflector 640 is more reflected into the first lens module 610, so as to improve a fingerprint collection effect of the fingerprint sensor 620, thereby increasing an unlocking success rate of the electronic device 20.

Figure 6:
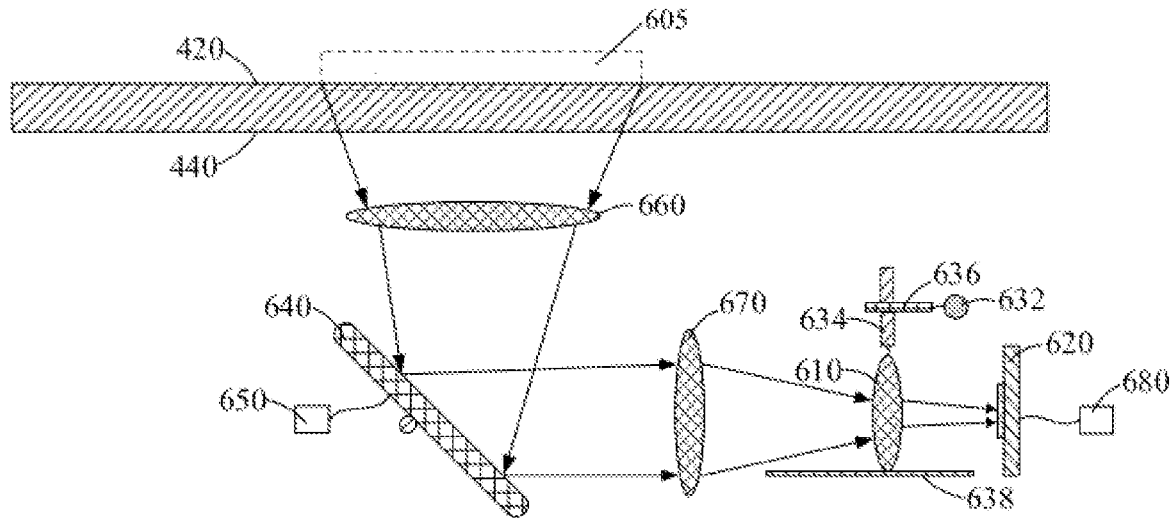
FIG. 6 is a schematic diagram of a fourth structure of the display screen and the fingerprint collection device in the electronic device shown in FIG. 1.

Please refer to FIG. 6. FIG. 6 is a schematic diagram of a fourth structure of the display screen and the fingerprint collection device in the electronic device shown in FIG. 1. The fingerprint collection device 600 may further comprise a second lens module 660. The second lens module 660 is disposed between the non-display surface 440 of the display screen 400 and the reflector 640. The second lens module 660 can condense the optical signal transmitted through the non-display surface 440 of the display screen 400 to the reflector 640, thereby increasing a signal amount of the optical signal received by the reflector 640, increasing a signal amount of the reflected optical signal, and improving the fingerprint collection effect of the fingerprint sensor 620. The second lens module 660 may comprise one or more lenses, and the one or more lenses may be convex lenses. A size of the second lens module 660 may be greater than a size of the reflector 640.

Please refer to FIG. 6, the fingerprint collection device 600 may further comprise a third lens module 670. The third lens module 670 is disposed between the reflector 640 and the first lens module 610. The third lens module 670 can condense the reflected optical signal, so that the reflected optical signal formed by the reflector 640 is condensed to the first lens module 610, thereby increasing a signal amount of the optical signal received by the first lens module 610, increasing a signal amount of the optical signal received by the fingerprint sensor 620, and improving the fingerprint collection effect of the fingerprint sensor 620. The third lens module 670 may comprise one or more lenses, and the one or more lenses may be convex lenses. A size of the third lens module 670 may be greater than a size of the first lens module 610.

During a process of collecting the fingerprint information by the fingerprint sensor 620, if a focus of the first lens module 610 is not located on the fingerprint sensor 620, a fingerprint image collected by the fingerprint sensor 620 may be blurred.

In order to make the fingerprint image collected by the fingerprint sensor 620 reach a preset condition (such as a definition condition), in this embodiment, the fingerprint collection device 600 may further comprise a third driving mechanism 680. The third driving mechanism 680 may be disposed on the casing 200. The third driving mechanism 680 is connected to the fingerprint sensor 620. The third driving mechanism 680 is configured to drive the fingerprint sensor 620 to move in a direction perpendicular to the optical path of the optical signal received by the fingerprint sensor 620, so as to fine adjust a position of the fingerprint sensor 620, so that the focus of the first lens module 610 is located on the fingerprint sensor 620, thereby adjusting an imaging definition of the fingerprint sensor 620.

Figure 7:
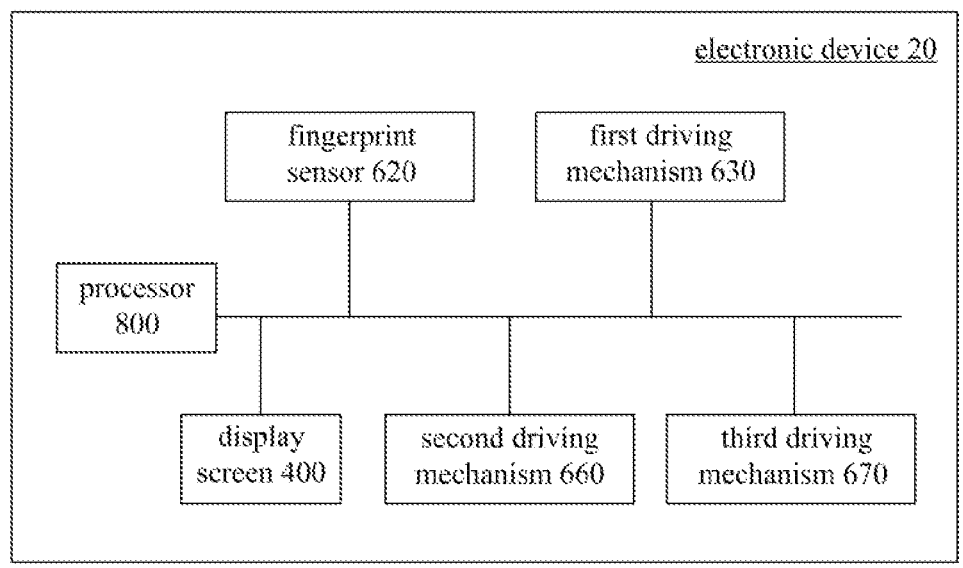
FIG. 7 is a schematic diagram of a second structure of the electronic device according to an embodiment of the present disclosure.

Please refer to FIG. 7. FIG. 7 is a schematic diagram of a second structure of the electronic device according to an embodiment of the present disclosure. The electronic device 20 may further comprise processor 800. The processor 800 may be disposed on a circuit board of the electronic device 20. The processor 800 may be configured to process various operations of the electronic device 20.

For example, the processor 800 may control the display screen 400 in the electronic device 20 to display images. The processor 800 may control the fingerprint collection device 600 in the electronic device 20 to collect fingerprints.

For example, the processor 800 may control the movement of the first lens module 610 according to the adjustment instruction, so as to increase or decrease the fingerprint information collection area 605 of the fingerprint sensor 620.

For example, the electronic device 20 may be provided with an adjustment button for the fingerprint information collection area 605 of the fingerprint sensor 620. The adjustment button may comprise an instruction for increasing the fingerprint information collection area 605. The user can issue the adjustment instruction by touching the adjustment button. The adjustment instruction may be the instruction for increasing the fingerprint information collection area 605. After the processor 800 receives the adjustment instruction, the processor 800 controls the first driving mechanism 630 to drive the first lens module 610 to move toward the fingerprint sensor 620, so as to reduce the distance between the first lens module 610 and the fingerprint sensor 620, thereby increasing an incident angle of the optical signal transmitted through the display screen 400 and increasing the fingerprint information collection area 605 of the fingerprint sensor 620.

It should be noted that the adjustment button may comprise an instruction for reducing the fingerprint information collection area 605. The user can issue the adjustment instruction by touching the adjustment button. The adjustment instruction may be the instruction for reducing the fingerprint information collection area 605. After the processor 800 receives the adjustment instruction, the processor 800 controls the first driving mechanism 630 to drive the first lens module 610 to move away from the fingerprint sensor 620, so as to increase the distance between the first lens module 610 and the fingerprint sensor 620, thereby reducing the incident angle of the optical signal transmitted through the display screen 400 and reducing the fingerprint information collection area 605 of the fingerprint sensor 620.

The processor 800 may adjust the distance between the first lens module 610 and the fingerprint sensor 620 by itself according to the fingerprint information collected by the fingerprint sensor 620.

For example, the user may press the display surface 420 of the display screen 400 with a finger. When the processor 800 detects that there is a pressing operation on the display surface 420 of the display screen 400, the processor 800 controls the fingerprint sensor 620 to collect fingerprint information to obtain a first target fingerprint information. The processor 800 determines whether a matching degree between the first target fingerprint information and the preset fingerprint information pre-stored in the electronic device 20 is lower than a preset value. If the matching degree between the first target fingerprint information and the preset fingerprint information is lower than the preset value, it may be that the fingerprint information collection area 605 of the fingerprint sensor 620 is too small, so that the matching degree between the first target fingerprint information and the preset fingerprint information cannot meet the preset value. At this time, the processor 800 may control the first driving mechanism 630 to drive the first lens module 610 to move toward the fingerprint sensor 620, so as to reduce the distance between the first lens module 610 and the fingerprint sensor 620, thereby increasing the fingerprint information collection area 605.

The processor 800 may be further configured to control the fingerprint sensor 620 to collect fingerprint information after increasing the fingerprint information collection area 605 to obtain a second target fingerprint information, and may be further configured to determine whether a matching degree of the second target fingerprint information and the preset fingerprint information meets the preset value. If the matching degree of the second target fingerprint information and the preset fingerprint information meets the preset value, it means that the fingerprint is recognized successfully. The processor 800 may perform an operation in response to successfully recognizing the fingerprint, such as an unlock operation, an account login operation, or a mobile payment operation.

For another example, when the processor 800 detects that there is a pressing operation on the display surface 420 of the display screen 400, but the fingerprint sensor 620 cannot collect fingerprint information in a preset region, the processor 800 may control the first driving mechanism 630 to drive the first lens module 610 to move toward the fingerprint sensor 620, so as to reduce the distance between the first lens module 610 and the fingerprint sensor 620, thereby increasing the preset area, so that the fingerprint sensor 620 can collect the fingerprint information.

In some embodiments, when the fingerprint sensor 620 collects fingerprint information in the preset area, the collected fingerprint information may be compared with the preset fingerprint information. When a matching degree between the collected fingerprint information and the preset fingerprint information is less than a preset value, the distance between the first lens module 610 and the fingerprint sensor 620 is further adjusted, so as to avoid a situation that fingerprint recognition fails due to incomplete fingerprint information collection. In order to further describe a fingerprint collection function of the electronic device in this embodiment, a method for controlling the electronic device is defined below. The method for controlling the electronic device comprises the following steps.

Obtaining a detection result of the display screen 400. The detection result comprises a pressing operation or no operation.

When the detection result comprises the pressing operation, controlling the fingerprint sensor 620 to collect fingerprint information according to the pressing operation.

Determining whether the fingerprint sensor 620 has collected the fingerprint information.

If the fingerprint sensor 620 does not collect the fingerprint information, controlling the first lens module 610 to move, so as to increase a fingerprint information collection area 605 of the fingerprint sensor 620.

During the movement of the first lens module 610, the fingerprint sensor 620 may collect fingerprint information in real time, and match newly collected fingerprint information with a preset fingerprint information to obtain a matching degree. When the matching degree reaches a preset value, the first lens module 610 may be controlled to stop moving. When the fingerprint information collection area 605 has been increased to a maximum value of a variable range, and the matching degree between the fingerprint information collected by the fingerprint sensor 620 and the preset fingerprint information has not reached the preset value, it may be that the fingerprint information collected by the fingerprint sensor 620 is not the user's own fingerprint information, or the user's own finger has stains or sweat, etc. The maximum value of the variable range may be determined according to the movable range of the first lens module 610. The movable range of the first lens module 610 may be determined according to a length or thickness of the electronic device 20 and imaging conditions of the fingerprint sensor 620.

If the fingerprint sensor 620 collects the fingerprint information, determining whether a matching degree between the fingerprint information collected by the fingerprint sensor 620 and a preset fingerprint information reaches a preset value.

If the matching degree between the fingerprint information collected by the fingerprint sensor 620 and the preset fingerprint information does not reach the preset value, controlling the first lens module 610 to continue to move.

The electronic device and the method for controlling the same provided by the present disclosure are described in detail above. The present disclosure uses specific examples to describe principles and embodiments of the present disclosure. The above description of the embodiments is only for helping to understand the present disclosure. Furthermore, those skilled in the art may make modifications to the specific embodiments and applications according to ideas of the present disclosure. In conclusion, the present specification should not be construed as a limitation to the present disclosure.

What is claimed is:

1. An electronic device, comprising:
   a display screen comprising a display surface and a non-display surface opposite to each other;
   a first lens module;
   a fingerprint sensor configured to receive an optical signal transmitted through the non-display surface and the first lens module to collect fingerprint information; and
   a first driving mechanism connected to the first lens module and configured to drive the first lens module to move, so as to change a fingerprint information collection area of the fingerprint sensor, wherein the first lens module, the fingerprint sensor, and the first driving mechanism are disposed close to the non-display surface; and
   a processor connected to the first driving mechanism, wherein the processor is configured to control a movement of the first lens module to increase the fingerprint information collection area of the fingerprint sensor when the fingerprint sensor does not collect the fingerprint information or a matching degree between the fingerprint information collected by the fingerprint sensor and a preset fingerprint information is lower than a preset value.

2. The electronic device according to claim 1, wherein the first lens module is disposed between the non-display surface and the fingerprint sensor, and the first driving mechanism is configured to drive the first lens module to move in a direction perpendicular to the non-display surface.

3. The electronic device according to claim 2, further comprising:
   a reflector disposed close to the non-display surface, disposed corresponding to the first lens module, and configured to reflect the optical signal transmitted through the display screen to the first lens module.

4. The electronic device according to claim 1, further comprising:
   a reflector disposed close to the non-display surface, disposed obliquely with respect to the non-display surface, and configured to reflect the optical signal transmitted through the display screen to the first lens module, wherein the first driving mechanism is further configured to drive the first lens module to move in a direction parallel to the non-display surface.

5. The electronic device according to claim 4, further comprising:
   a second driving mechanism connected to the reflector and configured to drive the reflector to rotate, so as to increase a signal amount of the optical signal reflected to the first lens module.

6. The electronic device according to claim 4, further comprising:
   a second lens module disposed between the display screen and the reflector and configured to condense the optical signal transmitted through the display screen to the reflector, so as to increase a signal amount of the optical signal received by the reflector.

7. The electronic device according to claim 4, wherein further comprising:
   a third lens module disposed between the reflector and the first lens module and configured to condense the optical signal reflected by the reflector to the first lens module, so as to increase a signal amount of the optical signal received by the first lens module, wherein a size of the third lens module is greater than a size of the first lens module.

8. The electronic device according to claim 1, further comprising:
   a third driving mechanism connected to the fingerprint sensor and configured to drive the fingerprint sensor to move, wherein the processor is connected to the third driving mechanism and is configured to control the fingerprint sensor to move in a direction perpendicular to an optical path of the optical signal received by the fingerprint sensor when the fingerprint information collected by the fingerprint sensor does not reach a preset condition, so as to fine adjust a position of the fingerprint sensor, so that a focus of the first lens module is located on the fingerprint sensor.

9. The electronic device according to claim 8, wherein the processor is further connected to the first driving mechanism, and is further configured to receive an adjustment instruction, and control a movement of the first lens module according to the adjustment instruction, so as to increase or decrease the fingerprint information collection area of the fingerprint sensor.

10. The electronic device according to claim 1, wherein the processor is further configured for:
    when receiving a fingerprint collection instruction, determining whether the fingerprint sensor has collected the fingerprint information;
    if the fingerprint sensor does not collect the fingerprint information, controlling the first lens module to move, so as to increase the fingerprint information collection area of the fingerprint sensor;
    if the fingerprint sensor collects the fingerprint information, determining whether the matching degree between the collected fingerprint information and the preset fingerprint information is lower than the preset value; and
    If the matching degree between the collected fingerprint information and the preset fingerprint information is lower than the preset value, controlling the first lens module to move, so as to increase the fingerprint information collection area of the fingerprint sensor.

11. The electronic device according to claim 1, further comprising:

a casing connected with the display screen to form a storage space, wherein the first lens module, the fingerprint sensor, and the first driving mechanism are disposed on the casing and located in the storage space.

12. The electronic device according to claim 1, wherein the first driving mechanism comprises a drive motor and a transmission assembly, an output end of the drive motor is connected to the transmission assembly, the transmission assembly is connected to the first lens module, and the drive motor is configured to drive the transmission assembly to drive the first lens module to move.

13. The electronic device according to claim 12, wherein the transmission assembly comprises one or two of a screw rod, a slide rail, and a gear module.

14. The electronic device according to claim 13, wherein the transmission assembly comprises a screw rod and a slide rail, the first lens module is disposed on the sliding rail, and the drive motor drives the first lens module to move on the slide rail through the screw rod.

15. The electronic device according to claim 1, wherein the first driving mechanism comprises a drive motor, a fixing bracket, a screw rod, and a slide rail, the fixing bracket is provided with a through hole, the screw rod is penetrated in the through hole and is rotatably connected to a hole wall of the through hole, an end of the screw rod is connected to the drive motor, an end of the first lens module is slidably connected to the slide rail, other end of the first lens module is connected to the fixing bracket, the drive motor is configured to drive the screw rod to rotate to drive the fixing bracket to move, when the fixing bracket moves, the fixing bracket drives the first lens module to move on the slide rail.

16. A method for controlling an electronic device, wherein the electronic device comprises a display screen, a first lens module, a fingerprint sensor, and a first driving mechanism, the display screen comprises a display surface and a non-display surface opposite to each other, the first lens module, the fingerprint sensor, and the first driving mechanism are disposed close to the non-display surface, the first lens module is connected to the first driving mechanism, and the method for controlling the electronic device comprises:
  obtaining a detection result of the display screen;
  when the detection result comprises a pressing operation, controlling the fingerprint sensor to collect fingerprint information according to the pressing operation;
  determining whether the fingerprint sensor has collected the fingerprint information; and
  if the fingerprint sensor does not collect the fingerprint information, controlling the first lens module to move, so as to increase a fingerprint information collection area of the fingerprint sensor.

17. The method for controlling the electronic device according to claim 16, wherein the step of "if the fingerprint sensor does not collect the fingerprint information, controlling the first lens module to move, so as to increase the fingerprint information collection area of the fingerprint sensor" comprises:
  if the fingerprint sensor collects the fingerprint information, determining whether a matching degree between the fingerprint information collected by the fingerprint sensor and a preset fingerprint information reaches a preset value; and
  if the matching degree between the fingerprint information collected by the fingerprint sensor and the preset fingerprint information does not reach the preset value, controlling the first lens module to continue to move.

18. The method for controlling the electronic device according to claim 17, wherein the step of "if the fingerprint sensor collects the fingerprint information, determining whether the matching degree between the fingerprint information collected by the fingerprint sensor and the preset fingerprint information reaches a preset value" comprises:
  collecting fingerprint information in real time through the fingerprint sensor during a movement of the first lens module, and comparing newly collected fingerprint information with the preset fingerprint information to obtain the matching degree.

19. The method for controlling the electronic device according to claim 17, wherein the step of "if the matching degree between the fingerprint information collected by the fingerprint sensor and the preset fingerprint information does not reach the preset value, controlling the first lens module to continue to move" comprises:
  if the matching degree between the fingerprint information collected by the fingerprint sensor and the preset fingerprint information reaches the preset value, controlling the first lens module to stop moving.

* * * * *